United States Patent [19]

Peters et al.

[11] Patent Number: 4,467,651

[45] Date of Patent: Aug. 28, 1984

[54] METHOD FOR DETERMINING ACCELERATION

[75] Inventors: Rex B. Peters, Woodinville; Arnold Malametz, Carnation; Jeffrey F. Tonn, Tacoma; Charles K. Lee, Seattle; Aleksandar M. Gogic, Seattle; Victor B. Corey, Bellevue, all of Wash.

[73] Assignee: Sundstrand Data Control, Inc., Redmond, Wash.

[21] Appl. No.: 456,255

[22] Filed: Jan. 6, 1983

[51] Int. Cl.$^3$ ............................................. G01P 15/10
[52] U.S. Cl. ............................... 73/497; 73/517 AV; 73/DIG. 1
[58] Field of Search ................. 73/517 AV, 497, 1 D, 73/DIG. 1

[56] References Cited

U.S. PATENT DOCUMENTS 3,479,536 11/1969 Norris ........................ 73/517 AV X
4,155,257 5/1979 Wittke ............................ 73/DIG. 1

OTHER PUBLICATIONS

Report AFWAL-TR-81-1229 entitled New Sensor Concepts Low Cost Vibrating Beam Accelerometer, by W. C. Albert, Dec., 1981.

*Primary Examiner*—James J. Gill
*Attorney, Agent, or Firm*—Wood, Dalton, Phillips, Mason & Rowe

[57] ABSTRACT

An accelerometer has two proof masses each constrained from movement by a beam resonant force transducer. The proof mass-force transducer systems are mounted with the sensitive axes of the proof masses aligned and the force transducers arranged so that their resonant frequencies $f_1$ and $f_2$ vary oppositely with a change in acceleration. The acceleration is determined in accordance with the relation $$a = A_1 f_1 - A_2 f_3 + A_0$$

or $$a = A_1 f_1^2 - A_2 f_2^2 + A_0$$

where a is the acceleration and $A_1$, $A_2$ and $A_0$ are calibration coefficients.

6 Claims, 3 Drawing Figures

METHOD FOR DETERMINING ACCELERATION

DESCRIPTION

1. Technical Field

The invention relates to a method for determining acceleration utilizing an accelerometer having dual proof masses each constrained by a beam resonant force transducer.

2. Related Application

Peters et al application Ser. No. 456,254 filed Jan. 6, 1983, filed concurrently herewith and assigned to the assignee of this application, discloses and claims novel structural features of the accelerometer shown herein.

BACKGROUND OF THE INVENTION

An accelerometer has been proposed having dual proof masses. Each of the proof masses is constrained against movement by a beam resonant force transducer. The acceleration is determined by the relative $a = A(f_1 - f_2)$ wherein a is the acceleration, A is the scale factor of the instrument, and $f_1$ and $f_2$ are the frequencies of the two force transducers.

The scale factors for the two proof mass-force transducer systems must be closely matched to achieve good linearity and to minimize vibration rectification errors. This is typically done by trimming the proof masses, that is, physically removing mass from one or the other proof masses until the scale factors for the two proof mass-force transducer systems match. This is a time consuming process requiring repetitive, successive trimming and testing of one or both proof masses.

SUMMARY OF THE INVENTION

The invention provides an improved method for determining the acceleration from the frequencies of the two beam resonant force transducers, which does not require matching the scale factors of the two proof mass-force transducer systems.

One feature of the invention is that the acceleration is determined in accordance with the relation $$a = A_1 f_1 - A_2 f_2 + A_0$$

where $A_1$, $A_2$ and $A_0$ are calibration coefficients.

Another feature of the invention is that the acceleration is determined in accordance with the relation $$a = A_1 f_1^2 - A_2 f_2^2 + A_0.$$

A further feature of the invention is that the calibration coefficients are determined from testing over a range of temperatures and accelerations for a desired operating condition, e.g., for a linear approximation of acceleration.

Further features and advantages of the invention will readily be apparent from the following specification and from the drawings.

BRIEF DESCRIPTION OF THE DRAWINGS

FIGS. 1 and 2 illustrate the preferred embodiment of the accelerometer having two proof masses 30, 31 sensitive to accelerations along the same axis mounted with the respective flexures opposite each other and with the beam resonant force transducers 32, 33 connected so that when one transducer is in tension the other is in compression. The acceleration is measured as a function of the difference between the resonant frequencies of the two beam force transducers. The two proof mass-transducer assemblies are identical and only one is shown in FIG. 2 and will be described in detail herein.

Figure 1:
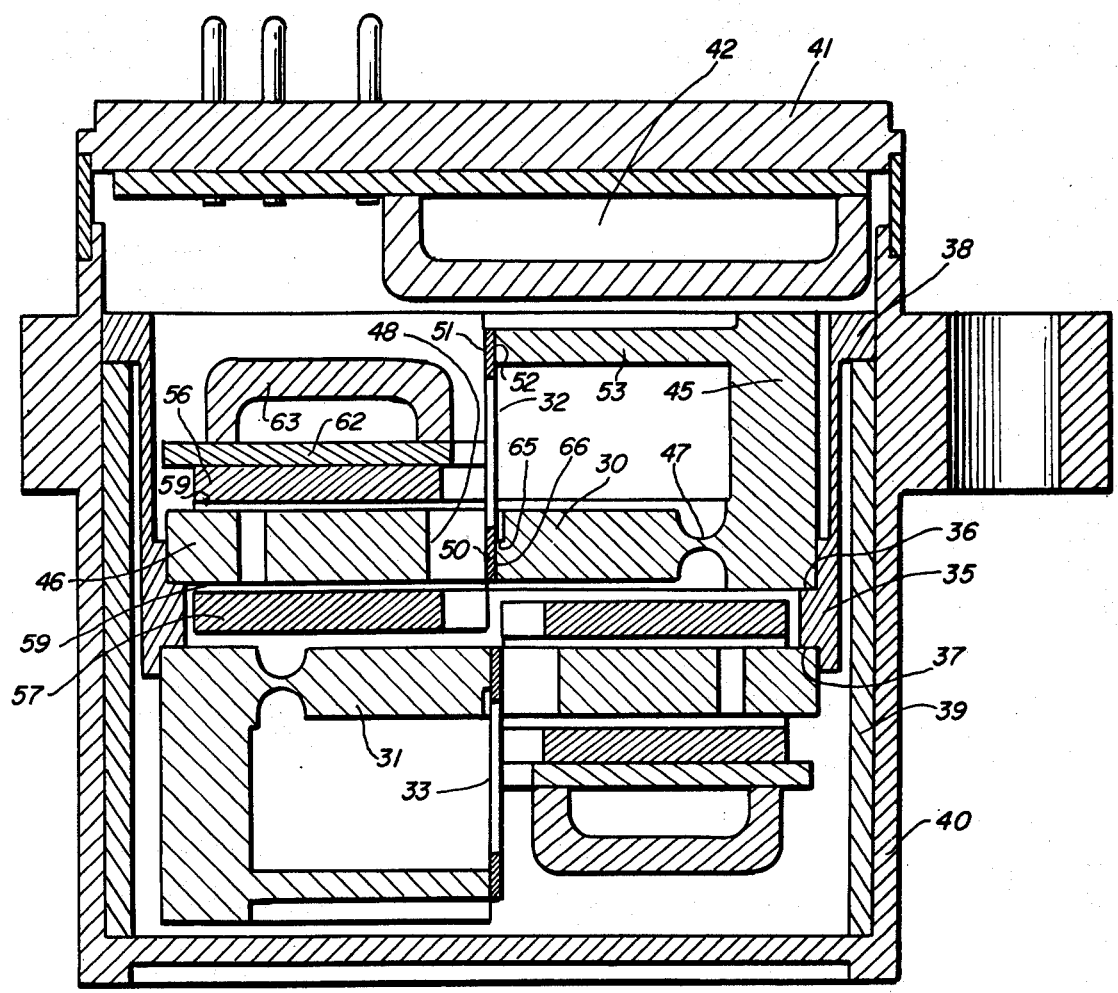
FIG. 1 is a longitudinal section through a preferred form of dual proof mass accelerometer used in practicing the invention.

Cylindrical carrier 35 has oppositely directed seating surfaces 36, 37. The base for each proof mass includes a mounting element which is received in one of the seating surfaces. Carrier 35 has an outwardly extending rib 38 seated on a cylindrical spacer 39, supporting the two proof mass assemblies within housing 40. Cover 41 has an electronics compartment 42.

Figure 2:
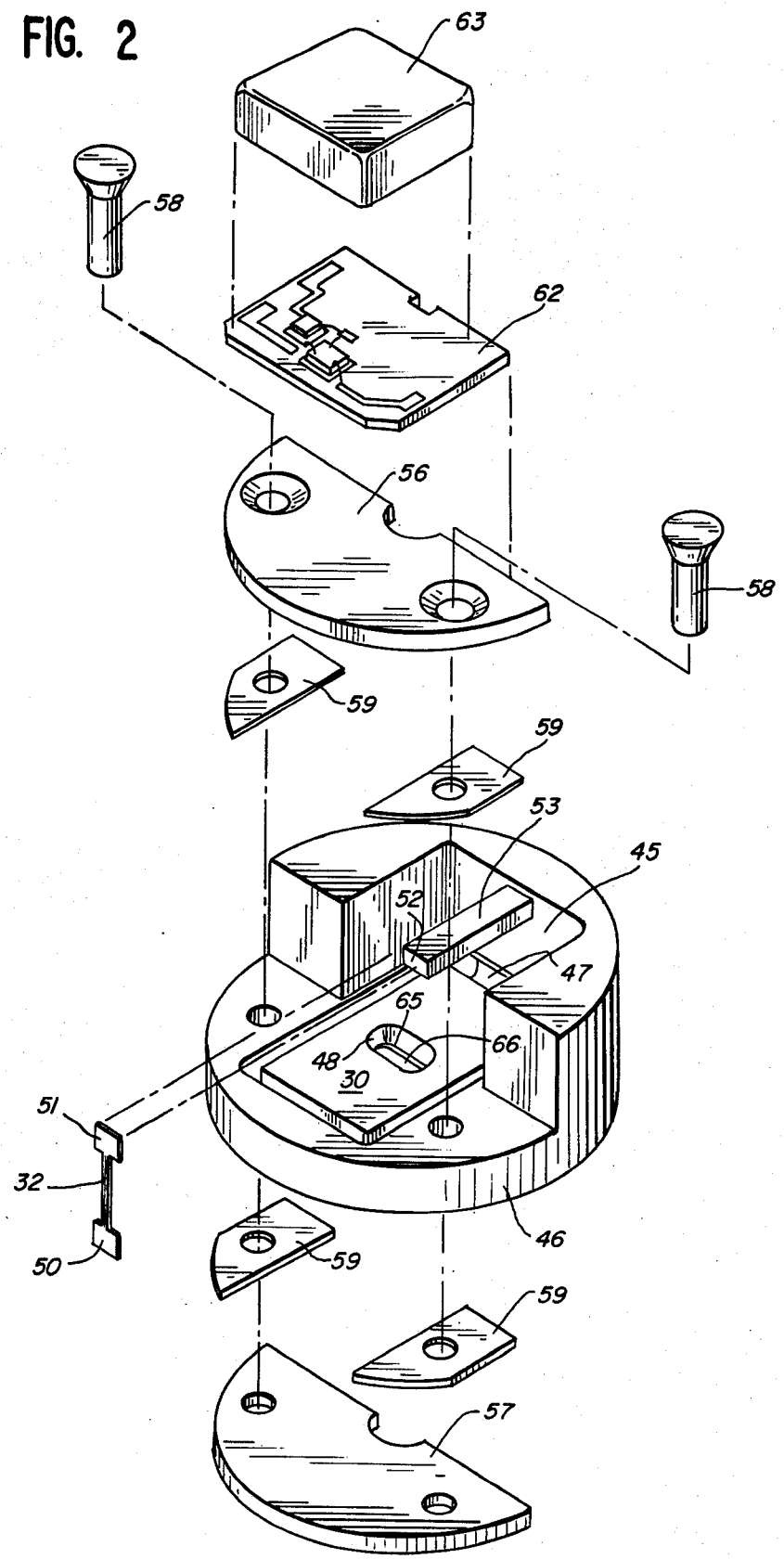
FIG. 2 is an exploded perspective of one proof mass and force transducer system of the accelerometer of FIG. 1.

The upper accelerometer of FIG. 1, illustrated in exploded form in FIG. 2, has a base 45 which includes a mounting ring 46. Proof mass 30 is connected with the base by flexure section 47. Mounting ring 46 is received on the seating surface 36 of carrier 35.

Proof mass 30 is generally rectangular in outline and has the same thickness as mounting ring 46. An oval opening 48 is centrally located in the proof mass.

Beam resonant force transducer 32 has one end 50 secured to the wall of the opening 48 and the other end 51 connected with the end surface 52 of a cantilever beam 53 extending from base 45 and providing a compliant mount. Plates 56 and 57 are secured to the upper and lower surfaces of mounting ring 47, respectively, and are held in place by fasteners 58. Shims 59 are interposed between the plates 56, 57 and the surfaces of mounting ring 46 spacing the surfaces of the plates 56, 57 from the upper and lower surfaces of proof mass 30. The spacing is exaggerated in FIG. 1. Plates 56, 57 serve as combined damping surfaces and stops for proof mass 30 as discussed in more detail in the aforementioned copending application.

A circuit board 62 is mounted on the upper surface of plate 56 and carries the electronics associated with resonant beam force transducer 32. A cover 63 encloses the components on the circuit board.

As best seen in FIG. 2, the wall of opening 48 in proof mass 30 has a step 65 in the surface closest to the flexure 47. The end 50 of transducer 32 is connected with the surface 66 remote from cantilever beam 53. The surface 66 is selected to include the center of percussion of proof mass 30. The center of percussion is that point in the proof mass at which the proof mass may be squarely struck without jarring the pivot axis provided by flexure 47. This geometric relationship minimizes the sensitivity of the proof mass to vibrations of the accelerometer.

There are a number of advantages achieved with the two proof mass construction illustrated in FIG. 2. Error sources which produce common mode effects on both proof mass-force transducer systems will be reduced. For example, if both transducers have similar temperature coefficients, the temperature sensitivity of the combination is considerably reduced.

Another example is the drift in the time base against which the transducer output frequencies are measured. Bias of the accelerometer is very sensitive to time base changes in a single proof mass sensor. If proof mass-transducer assemblies are approximately matched, so that $A_0$ is smaller than full scale, time base drift is primarily a common mode signal and bias sensitivity is greatly reduced.

The location of the two proof masses 30, 31 with their flexures opposite each other causes a cancellation of the sensitivity of the two proof masses to cross-axis accelerations.

Vibration rectification errors occur when the accelerometer is subjected to an oscillation input having a period shorter than the period for measuring the transducer frequencies. Nonlinear response of the transducers causes rectification of such oscillating inputs with a resultant shift in the accelerometer output. With the dual proof mass assembly having transducers mounted so that one is in tension and the other in compression, vibration rectification errors tend to cancel.

Figure 3:
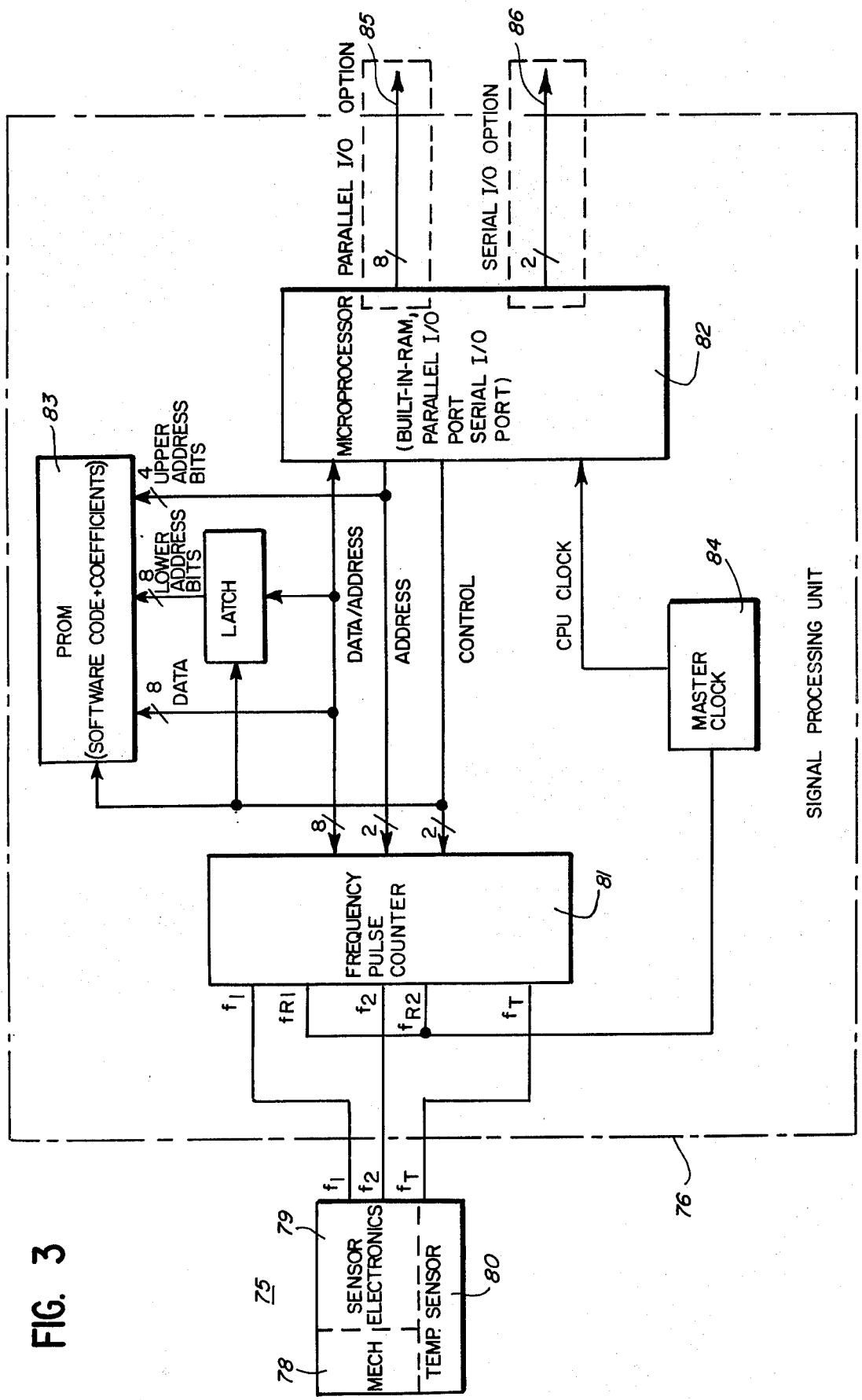
FIG. 3 is a block diagram of a signal processor for determining acceleration from the two force transducer frequency signals.

FIG. 3 shows diagrammatically the dual proof mass acceleration sensor 75 together with its associated electronics and a signal processing unit 76 including a programmed microprocessor for determining from the force transducer frequencies and other relevant inputs, such as temperature, the acceleration to which the instrument is subjected.

Sensor 75 includes the dual proof mass-beam resonant force transducer mechanical systems 78 and sensor electronics 79 which generate frequencies $f_1$, $f_2$ representing the resonant frequencies of each force transducer and thus the forces exerted on the force transducers as a result of the acceleration to which the proof masses are subjected. Temperature sensor 80 measures the temperature of the mechanical systems 78 and provides a signal $f_t$ which has a frequency that is a function of temperature.

Signal processing unit 76 includes a frequency-pulse counter 81, microprocessor 82 and PROM 83. Master clock 84 provides timing inputs to the microprocessor and the frequency pulse counter. Data/address, address and control lines having the indicated number of bus lines interconnect the frequency-pulse counter 81, microprocessor 82 and PROM 83.

The force transducer frequency signals $f_1$, $f_2$ and the temperature signal $f_t$ are connected with the frequency pulse counter 81 which generates digital signals representing each frequency for use in the microprocessor 82. The calculated acceleration is provided at the output of microprocessor 82, optionally, in 8-bit parallel/byte-serial form at 85 or in bit-serial form at 86.

In accordance with the invention weighting factors or coefficients are established for the frequencies of the force transducers of each proof mass. For example, acceleration may be determined as $$a = A_1 f_1 - A_2 f_2 + A_0$$

where $A_1$ is the weighting factor or coefficient for one force transducer, $A_2$ is the weighting factor or coefficient for the other transducer, and $A_0$ is a bias correction term.

Preferably, however, the acceleration is determined as a function of the square of the force transducer frequencies in accordance with the relationship $$a = A_1 f_1^2 - A_2 f_2^2 + A_0.$$

The relationship using the square of the frequency provides better linearity and less sensitivity to changes in the sensitivity of one force transducer relative to the other. In particular, the vibration rectification error due to small changes in relative scaling of the two transducers, e.g. as a function of frequency, is typically an order of magnitude smaller when the square of frequency is used.

The calibration coefficients $A_1$, $A_2$ and $A_0$ are modeled for selected operating conditions of the accelerometer, as for temperature, More particularly, the coefficients are preferably determined so that the algorithm gives the best approximation of the input acceleration over the full input range. The set of coefficients is determined from the calibration of the instrument at several discrete temperatures $T_j$ in the operating range of the accelerometer. The coefficients can be represented as a matrix $$\{A_{ij}\}; j = 1, 2, 3, \ldots; i = 1, 2, 0.$$

Each coefficient $A_i$ is then modeled with a least-squares-fit-polynomial function with respect to temperature $$A_i = \sum_{k=0}^{n} B_{ik} \cdot T^k; i = 1, 2, 0,$$

where $B_{ik}$ are the polynomial coefficients corresponding to $A_i$

Other sets of calibration coefficients may be utilized, based on a property other than linearity. For example, the coefficient may be selected to minimize the derivative (da/dT) of acceleration with respect to temperature.

The acceleration model based on the best approximation of the actual acceleration over the full input range minimizes error from vibration rectification and is preferred.

Modeling is preferably performed by making measurements of acceleration in the range from $-1$ g through 0 g to $+1$ g for temperatures throughout the operating temperature range of the instrument. Typically, the input acceleration is the earth's gravity and the accelerometer is positioned with its sensitive axis successively in 24 different attitudes with respect to the vertical. The procedure is repeated at various temperatures throughout the operating range.

The calibration coefficients are determined as indicated above and this information is stored in PROM 83 to be called up by the microprocessor as needed. The number of temperatures at which measurements are made and the number of terms of the temperature polynomials are factors in determining the precision of the acceleration measurement.

Under control of the microprocessor 82 the digital frequencies $f_1$, $f_2$ and the temperature are periodically samples at the output of frequency pulse counter 81. The calibration coefficients $A_1$, $A_2$ and $A_0$ are retrieved from PROM 83 and the acceleration calculated.

We claim:

1. In an accelerometer having dual proof masses sensitive to the same acceleration, with a pair of beam resonant force transducers, one connected with each proof mass for sensing the force induced in the proof mass by acceleration, the transducers having resonant frequencies $f_1$ and $f_2$ which vary oppositely with a change in acceleration, the improved method of determining the acceleration from the transducer frequencies in accordance with the relation $$a = A_1 f_1 - A_2 f_2 + A_0,$$

where $A_1$, $A_2$ and $A_0$ are calibration coefficients.

2. In an accelerometer having dual proof masses sensitive to the same acceleration, with a pair of beam resonant force transducers, one connected with each proof mass for sensing the force induced in the proof mass by acceleration, the transducers having resonant frequencies $f_1$, $f_2$ which vary oppositely with a change in acceleration, the improved method of determining the acceleration from the transducer frequencies in accordance with the relation $$a = A_1 f_1^2 - A_2 f_2^2 + A_0,$$

where $A_1$, $A_2$ and $A_0$ are calibration coefficients.

3. The method of claim 2 in which the calibration coefficients are determined for the best approximation of acceleration over the full input range and over the operating temperature range of the accelerometer.

4. The method of claim 3 in which the accelerometer is calibrated at discrete temperatures $T_j$ and the calibration coefficients are represented as a matrix of coefficients $$\{A_{ij}\}; j = 1, 2, 3, \ldots; i = 1, 2, 0.$$

5. The method of claim 4 in which each coefficient $A_i$ is modeled with a least-squares-fit polynomial function with respect to temperature, represented by $$A_i = \sum_{k=0}^{n} B_{ik} \cdot T^k; i = 1, 2, 0.$$

6. The method of claim 2 in which the caibration coeffficients are determined for a minimum value of the derivative of acceleration with respect to temperatures, (da/dT), where T is temperature.

* * * * *